(12) United States Patent
Robb et al.

(10) Patent No.: US 11,635,108 B2
(45) Date of Patent: Apr. 25, 2023

(54) FLEX PAD BEARING PAD CONFIGURATION

(71) Applicant: Ingersoll-Rand Industrial U.S., Inc., Davidson, NC (US)

(72) Inventors: James Lawrence Robb, China Grove, NC (US); Andrew J. Austin, Orchard Park, NY (US); Patrick Lynah, Davidson, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 17/851,922

(22) Filed: Jun. 28, 2022

(65) Prior Publication Data

US 2022/0325746 A1 Oct. 13, 2022

Related U.S. Application Data

(63) Continuation of application No. 17/203,029, filed on Mar. 16, 2021, now Pat. No. 11,371,552, which is a continuation of application No. 16/709,425, filed on Dec. 10, 2019, now Pat. No. 10,948,009.

(51) Int. Cl.
*F16C 17/03* (2006.01)

(52) U.S. Cl.
CPC ................... *F16C 17/035* (2013.01)

(58) Field of Classification Search
CPC .. F16C 17/035; F16C 32/0666; F16C 32/067; F16C 32/0677
See application file for complete search history.

(56) References Cited

U.S. PATENT DOCUMENTS

| 2,539,287 A | | 1/1951 | Ronald et al. | |
| 2,823,963 A | | 2/1958 | Balsiger | |
| 3,639,014 A | | 2/1972 | Sixsmith | |
| 3,926,482 A | * | 12/1975 | Schuller | F16C 17/035 384/103 |
| 5,054,938 A | * | 10/1991 | Ide | F16C 33/805 384/119 |
| 5,215,385 A | | 6/1993 | Ide | |

(Continued)

FOREIGN PATENT DOCUMENTS

| DE | 102017210969 A1 * | 1/2019 |
| EP | 0539927 A1 | 5/1993 |

(Continued)

OTHER PUBLICATIONS

Extended European Search Report for European Application No. 20212700.7, dated May 11, 2021.

*Primary Examiner* — Phillip A Johnson
(74) *Attorney, Agent, or Firm* — Kevin E. West; Advent, LLP

(57) ABSTRACT

A hydrodynamic bearing in the form of a flex pad bearing includes configurations structured to change a bearing characteristic. One form of the bearing includes a nonlinear back wall that includes a circular arc and a transition, where the back wall extends radially outward of a ligament. The bearing can include an opening for the deposit of a weighted mass, wherein the opening can threadingly receive a threaded weighted mass. In one form a sidewall that includes the back wall segment can have an average outer radius which determines a thickness of the flex pads.

20 Claims, 4 Drawing Sheets

(56) References Cited

U.S. PATENT DOCUMENTS

| | | |
|---|---|---|
| 5,284,392 A | 2/1994 | Ide |
| 5,372,431 A | 12/1994 | Ide |
| 5,531,522 A | 7/1996 | Ide et al. |
| 5,547,287 A | 8/1996 | Zeidan |
| 5,549,392 A | 8/1996 | Anderson |
| 5,664,888 A | 9/1997 | Sabin |
| 5,743,654 A | 4/1998 | Ide et al. |
| 5,772,334 A | 6/1998 | Parkins et al. |
| 9,951,811 B2 | 4/2018 | Mook et al. |
| 2017/0298988 A1* | 10/2017 | Mook .................. F16C 33/043 |
| 2019/0293115 A1 | 9/2019 | Innocenti et al. |

FOREIGN PATENT DOCUMENTS

| | | |
|---|---|---|
| GB | 645690 A | 11/1950 |
| WO | 9400819 A1 | 1/1994 |
| WO | 2015046887 A1 | 4/2015 |

\* cited by examiner

FLEX PAD BEARING PAD CONFIGURATION

TECHNICAL FIELD

The present disclosure generally relates to hydrodynamic bearings, and more particularly, but not exclusively, to flex pad bearings.

BACKGROUND

Providing improved flex pad bearing characteristics remains an area of interest. Some existing systems have various shortcomings relative to certain applications. Accordingly, there remains a need for further contributions in this area of technology.

SUMMARY

One embodiment of the present disclosure is a unique flex pad of a flex pad bearing system. Other embodiments include apparatuses, systems, devices, hardware, methods, and combinations for flex pad designs. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
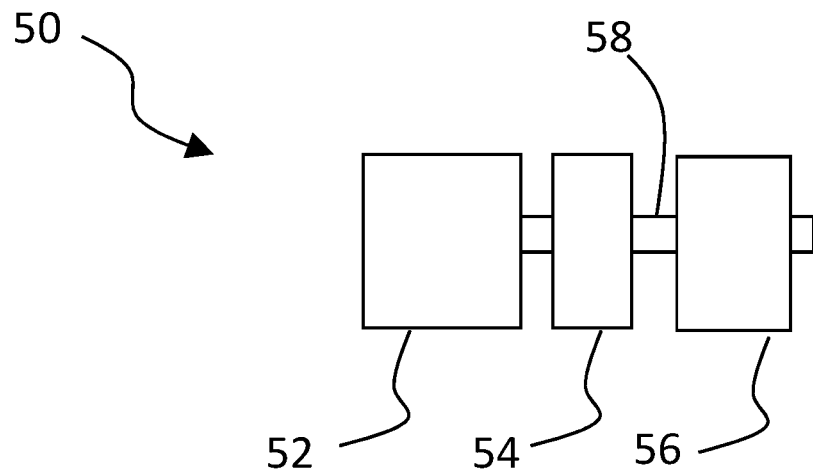
FIG. 1 illustrates a depiction of a compressor system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a compressor system 50 is shown which can be used to provide a pressurized flow of fluid for various applications, such as but not limited to various industrial applications. Air compressor systems can be used in a variety of applications such as in plant air systems, process air systems, etc. For example, compressed air from a compressor system can be used to supply a motive force for valve actuators and pneumatic cylinders used in robotic applications, as just a few nonlimiting examples.

The illustrated embodiment includes a compressor 52 which can take the form of a centrifugal compressor capable of rotating at high velocities and supplying pressurized air at large flow rates. Various embodiments of the compressor 52 can be structured to rotate at speeds anywhere from 10,000 revolutions per minute (RPM) to 80,000 RPM. In the form of a centrifugal compressor the impellers can weigh anywhere from 5 pounds to several hundred pounds). Although only a single compressor stage is illustrated in FIG. 1, other embodiments can include additional stages if needed. The centrifugal compressor 52 is supported by bearing 54 and is driven to operational speeds by motor 56 which drives a shaft 58. As will be appreciated, the shaft 58 is used to couple the compressor 52 to the motor 56, and the bearing 54 is used to provide support to the shaft 58. The bearing 54 discussed further below can take the form of a fluid dynamic journal bearing that operates on hydrodynamic principles. Further details of the bearing 54 will be discussed further below. As will be appreciated, the motor 56 can take any variety of forms including but not limited to an electric motor.

Figure 2:
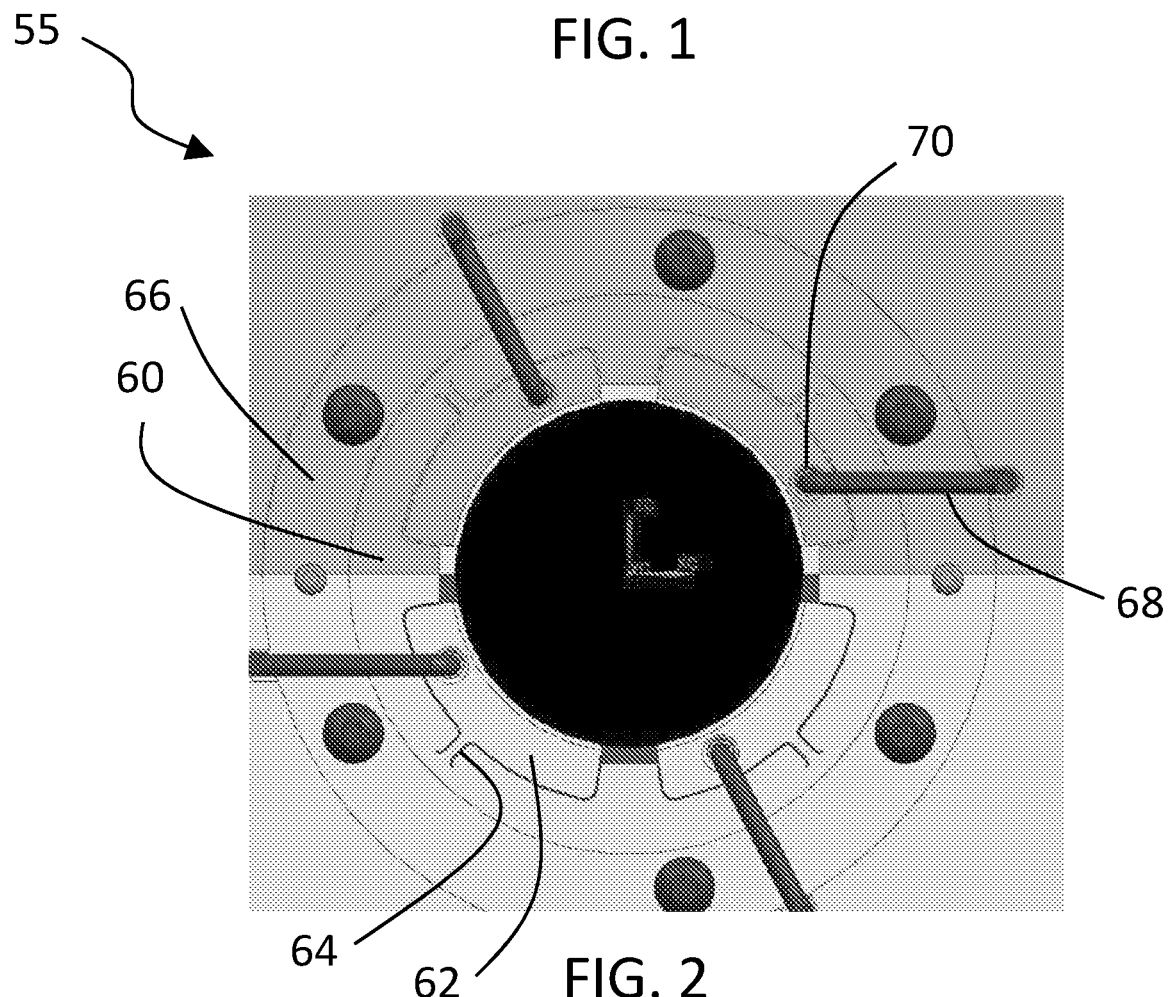
FIG. 2 illustrates a prior art flex pad bearing device.

Turning now to FIG. 2, one embodiment of a known bearing 55 is illustrated and which takes the form of a flex pad or flexure pivot bearing. The bearing 55 is sometimes used to support a compressor such as that described above with respect to compressor system 50. The flex pad bearing 55 includes a flex pad bearing base 60 which is integrally connected to a flex pad body 62 via a ligament 64. In general, the bearing 55 is made from a stock piece of material where the ligament 64 and body 62 are cut from the stock material. Such cutting can be accomplished using any suitable industrial process, such as but not limited to wire electrical discharge machining (EDM). The illustrated embodiment also includes a bearing cover 66 which obstructs the view in the illustrated embodiment of the outer radial extent of the flex pad bearing base 60. As will be appreciated, the flex pad bearing base 60 extends further radially outward and beneath the cover 66. The bearing 55 can be split into two halves as is illustrated in FIG. 2 which includes a top half and a bottom half, each half having its own formation of ligaments 64 and body 62. The illustrated embodiment also discloses a sensor lead line 68 which couples a measurement device (not illustrated) with a temperature sensor located in a recess 70 formed in the body 62. The temperature sensor can take the form of a conventional resistance temperature detector.

Figure 3:
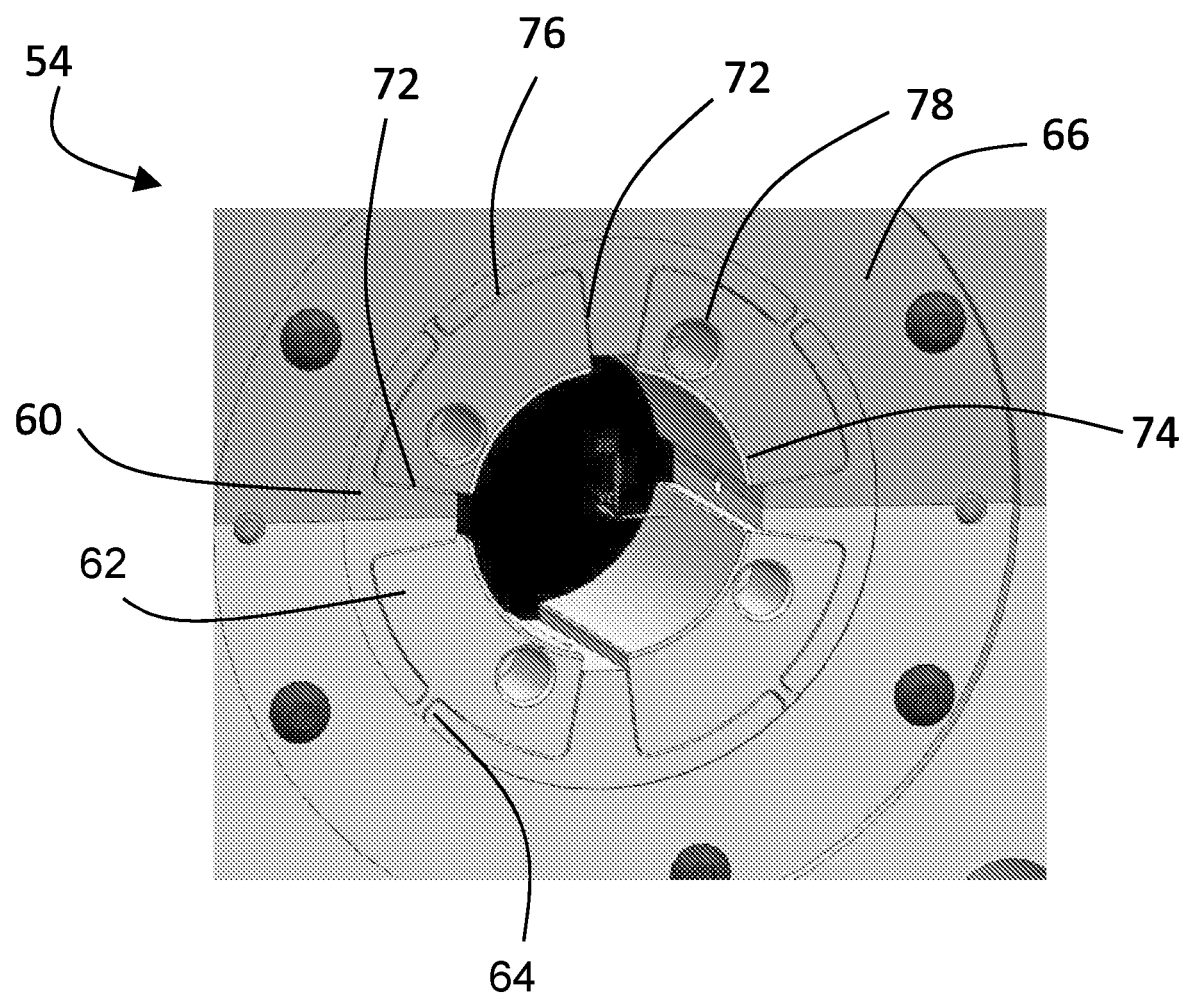
FIG. 3 illustrates an embodiment of a flex pad bearing.
Figure 4:
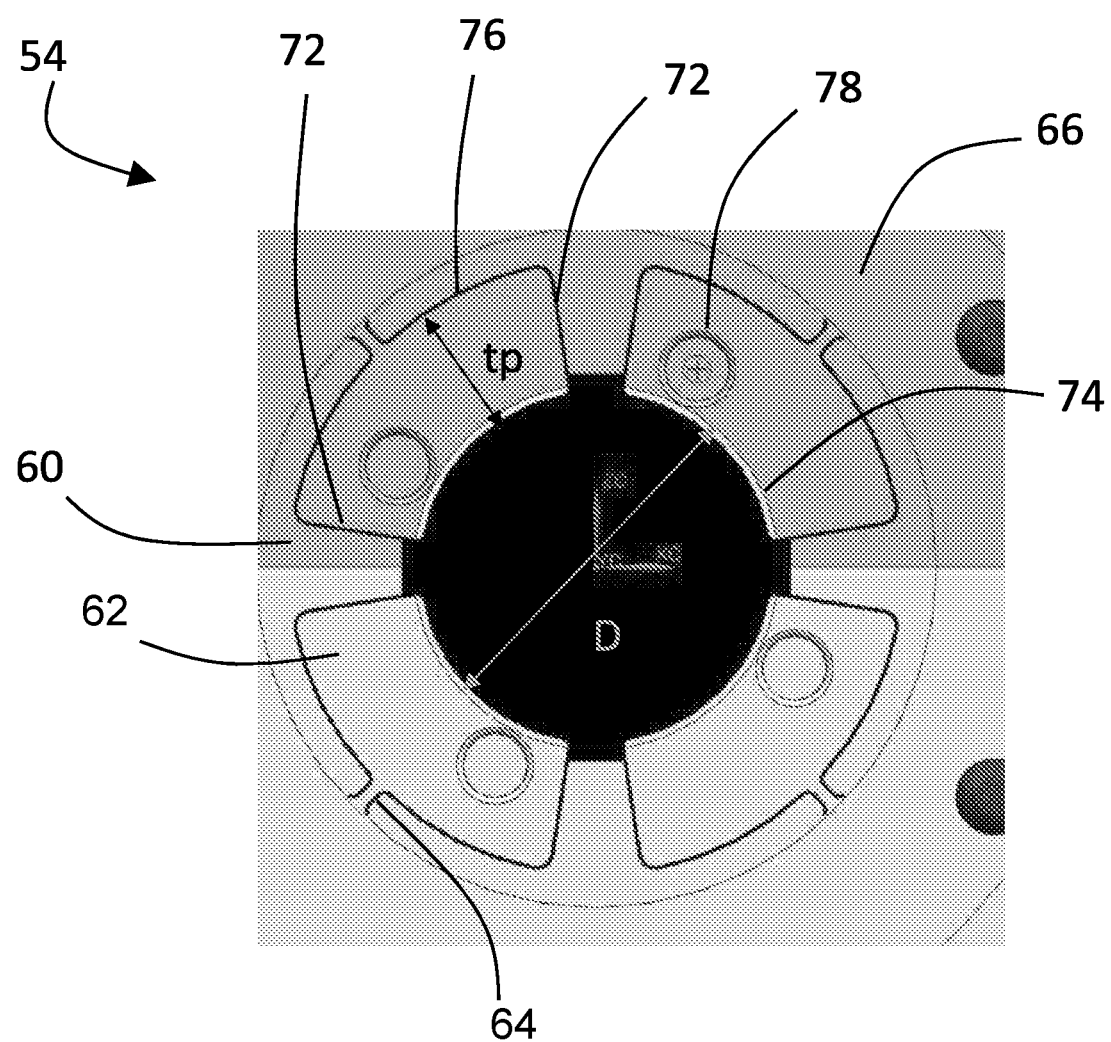
FIG. 4 illustrates an embodiment of a flex pad bearing.
Figure 5:
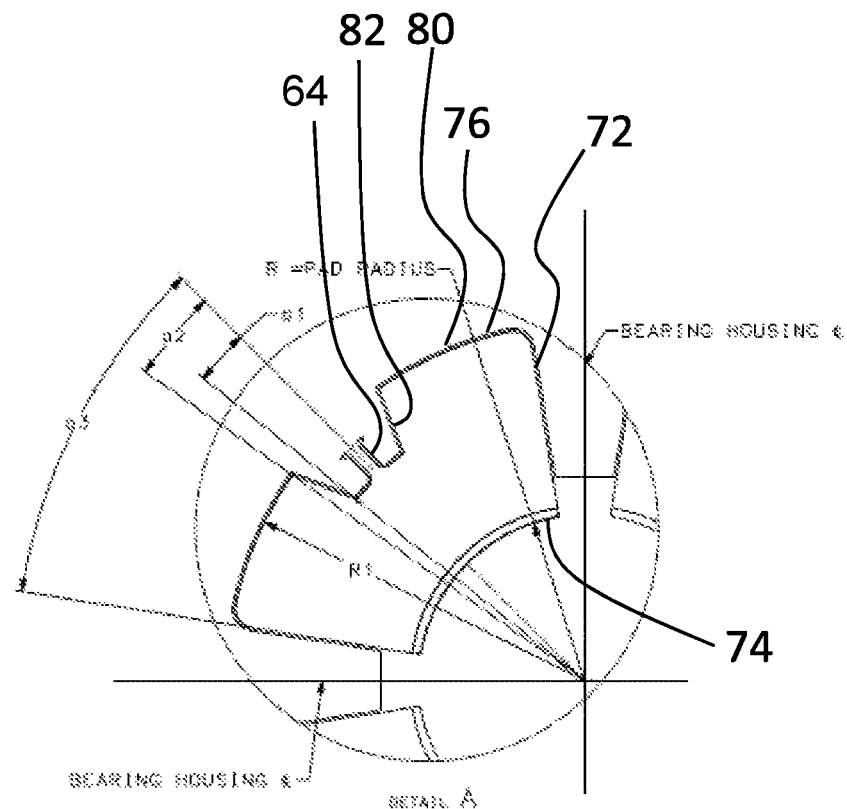
FIG. 5 illustrates an embodiment of a flex pad bearing.

Turning now to FIGS. 3-5, several embodiments are disclosed of the bearing 54 having unique characteristics useful to improve a measure of bearing stability in the form of critical journal mass. It is contemplated that the ligament 64 of the embodiments depicted in FIGS. 3-5 can take a variety of forms, not just the forms illustrated herein that generally extend along a radial line of extension to the central axis from a region at the bearing base 60 to a region at the flex pad body 62. Since the flex pad assembly is an integral assembly made from the same stock material, no limitation is hereby intended for the shape and/or thickness of the ligament 64. The ligament 64 can be symmetric as shown in the illustrated embodiments in which the ligament 64 includes opposing sides starting at a common radial location and ending at a common radial location. In contrast to the illustrated embodiments, some forms of the ligament may not be symmetric. The throat of the ligament 64 at the region where the ligament 64 transitions to the pad body 62 will be generally understood as the location where a cut line denotes a transition from the ligament 64 to the pad body 62.

FIGS. 3 and 4 illustrate bearing geometry and additionally and/or alternatively a bearing having provision to accept a weight to increase weight of the flex pad body 62. Sidewalls 72 extend outward from outer hydrodynamic fluid contact surfaces 74 of the respective flex pad bodies 62. The sidewalls 72 can extend with any type of geometry, and in the illustrated embodiment are depicted as having circumferentially offset first segments illustrated with reference numeral 72 which extend radially outward from the contact surfaces 74, along with back wall 76 which extend from the first segments to the ligament 64. In the illustrated embodiment of FIGS. 3 and 4 the back wall 76 extends in a circular shaped arc from the circumferentially offset first segments to an end of the ligament 64 in connection with the flex pad body 62.

FIG. 4 illustrates various measurements including: an internal diameter D of the central passage measured between outer fluid contact surfaces 74 of the respective flex pad bodies 62; a thickness $t_p$ which in the illustrated embodiment is a measure between back wall 76 and the contact surfaces 74; and an axis system centered at a central axis of the bearing 54. Although the sidewall 72 segment at the back wall 76 is depicted as extending in a circular shaped arc, other shapes are also contemplated, one of which is described further below with respect to FIG. 5. In the case of a non-circular portion of the sidewall 72 which renders difficult a measurement of thickness $t_p$, the instant disclosure contemplates assessing the thickness as the distance between the contact surface 74 and a suitable measure such as but not limited to average radial distance to the sidewall 72 at the back wall 76. For instance, average radial distance of the back wall 76 can be determined using any variety of methods, including at least analytic methods and computational methods. In one form the average radial distance can be determined using the equation:

$$\text{avg. radius} = \frac{\int_{\theta_1}^{\theta_2} r(\theta) d\theta}{\theta_2 - \theta_1} \quad \text{(Eq. 1)}$$

where average radius is determined over an arbitrary arc that extends from a first angle $\theta_1$ to a second angle $\theta_2$, and where the radius r is a function of the angle $\theta$. It will be appreciated that the equation represented above can be substituted for other expressions and/or algorithms that can either directly compute an average radius or can approximate an average radius.

Embodiments of FIGS. 3-5 include flex pad bodies 62 having ratios of $t_p/D$ that range from 0.36 and 0.48. The ratio $t_p/D$ of prior art devices in FIG. 2 is 0.16 which is far less than half of the lower end of the range contemplated in the instant disclosure. The inventors have discovered heretofore unappreciated benefits of higher values of the ratio $t_p/D$ than were used in the prior art.

In addition to or alternative to the range of ratios, the flex pad bodies 62 can include an opening 78 formed therein and suitable to accept a weighted mass (not pictured). The opening 78 can be formed completely through a depth of the flex pad bodies 62 such that the opening 78 forms a passage therethrough, but in other forms the opening 78 may only extend partially into the depth of the pad bodies 62. The opening 78 can take the form of a threaded bore such as can be formed when using a drill and tap procedure. The weighted mass can include complementary threads useful to be threadingly engaged with the opening. In one form the weighted mass is made of a denser material than the material of the flex pad bodies 62. The inclusion of the opening 78 and weighted mass can be used to increase the mass of the flex pad bodies.

The openings 78 can take any variety of forms, they can be placed in a variety of locations in the pad body 62, and in some forms each individual pad body can include one or more openings 78. In one form the opening 78 can be circumferentially offset from a radial line of extension from the central axis about which the ligament 64 is defined. Some forms can include openings 78 having at least a portion that circumferentially overlaps with the radial line of extension. In still additional and/or alternative embodiments, the opening 78 can include a center that is circumferentially aligned with the radial line of extension.

Turning now to FIG. 5, another embodiment of the flex pad body 62 and ligament 64 is illustrated. Though FIG. 5 is not illustrated with an opening 78 similar to that depicted and discussed above with respect to FIGS. 3 and 4, it will be appreciated that the embodiments associated with FIG. 5 can also include an opening 78 to accept a weighted mass. Furthermore, any variation associated with FIGS. 3 and 4 (e.g. variations in ligament shape and size, ratio of $t_p/D$ ranging from 0.36 to 0.48) can also be included in the embodiments associated with FIG. 5.

The embodiment depicted in FIG. 5 includes a sidewall 72 including back wall segment 76 that is nonlinear. The back wall 76 includes a circular arc portion 80 and transition portion 82. The average radius of the circular arc portion 80 and transition portion 82 can be determined using the approach described above to assist in calculating the ratio $t_p/D$. In the illustrated embodiment, the end of the ligament 64 as it transitions to the flex pad body 62 is located radially inward relative to the radially outermost portion of the back wall 76. Other embodiments can include a nonlinear back wall 80 which arcs in a noncircular shape from the sidewall 72 to the ligament 64 which may include all points at or radially inward of the end of the ligament 64 as it transitions to the flex pad body 62. Also in the illustrated embodiment, the beginning of the ligament 64 as it transitions from the bearing base 60 is located radially inward relative to the radially outermost portion of the back wall 76. Other embodiments can include a nonlinear back wall 80 which arcs in a noncircular shape from the sidewall 72 to the ligament 64 which may include all points at or radially inward of the beginning of the ligament 64 as it transitions from the bearing base 60.

In some forms the flex pad body geometry can coincide with the limitations set forth in FIG. 5. The term "dpad" in the limitations corresponds to the diameter between fluid contact surfaces 74, with "R" corresponding to the radius, or half of "dpad." Specifically, in some forms the distance to the circular arc portion 80 can range from 2R to 4R; the angle between a centerline of the ligament 64 and the sidewall 72 is from 0.3 dpad to 0.7 dpad; the angle between the centerline of the ligament 64 and the intersection between the circular arc 80 and transition 82 can range from 0.2 a3 to 0.8 a3; and the angle between the centerline of the ligament 64 and the beginning of the transition 82 can be about 10 degrees. Although not set forth above, a small circular arc segment can be located between the end of the ligament 64 at the flex pad body 62 and the start of the transition 82. This small circular arc segment can be considered part of the back wall portion 76 in some forms, where the average radius of the back wall portion can include the small circular arc segment.

It is contemplated that in some embodiments the number of flex pad bodies 62 used throughout the flex pad bearing assembly 54 is an even number, for example four flex pad bodies 62, six flex pad bodies 62, etc.

One aspect of the present application includes an apparatus comprising a flex pad bearing assembly structured to support radial loads through a plurality of flex pads integrally coupled with a flex pad bearing base, the flex pad bearing assembly constructed about a central axis of the flex pad bearing assembly, each of the flex pads including: a ligament integrally connected to a flex pad body, the ligament extending from the flex pad bearing base at a first end of the ligament to the flex pad body at a second end of the ligament, the flex pad body having a bearing contact surface forming an arc positioned at a first radius from the central axis of the flex pad bearing assembly, the flex pad body also including a first sidewall circumferentially offset from a second sidewall where the first and second sidewalls extend away from the bearing contact surface toward the second end of the ligament, the first and second sidewalls extending to a location between the bearing contact surface and the second end of the ligament and radially outward from the second end of the ligament.

A feature of the present application includes wherein the first and second sidewalls include a side segment that extends radially inward from the bearing contact surface, and a back segment that extends from the side segment to the second end of the ligament.

Another feature of the present application includes wherein the back segment is a non-circular arc as it extends from the side segment to the second end of the ligament.

Yet another feature of the present application includes wherein the back segment includes a first portion defined by a circular arc, and wherein the union of the first portion with a remaining portion of the back segment results in a back segment having a non-circular arc.

Still another feature of the present application includes wherein the back segment includes a plurality of portions each located at respective radial distances from the central axis, and wherein the back segment is defined by an average radial distance from the central axis as the back segment extends from the side segment to the second end of the ligament at back segment average radial distance.

Yet still another feature of the present application includes wherein the flex pad bearing assembly includes a central passage defined by respective bearing contact surfaces of the plurality of flex pads, the central passage having a passage diameter, wherein each flex pad body includes a thickness defined between the bearing contact surface and the back segment average radial distance, and wherein a ratio of thickness to passage diameter of the flex pad bearing assembly is between 0.36 and 0.48.

Still yet another feature of the present application includes wherein the flex pad body includes a threaded bore and a mass balance weight threadingly affixed to the threaded bore, the mass balance weight having a material density greater than a material density of the flex pad body.

A further feature of the present application includes wherein the first and second sidewalls include a side segment that extends radially inward from the bearing contact surface, and a back segment that extends from the side segment to the second end of the ligament, the back segment having a circular arc, and wherein the flex pad bearing assembly includes a central passage defined by respective bearing contact surfaces of the plurality of flex pads, the central passage having a passage diameter, wherein each flex pad body includes a thickness defined between the bearing contact surface and an average radius of the back segment, and wherein a ratio of thickness to passage diameter of the flex pad bearing assembly is between 0.36 and 0.48, and wherein a center of mass of the flex pad body is laterally offset from an axis of extension of the ligament as it is aligned along a radial line from the central axis.

Another aspect of the present application includes an apparatus comprising an integral flex pad bearing assembly having a plurality of flex pad bodies distributed around a central axis and connected to a flex pad bearing base circumferentially defined about the integral flex pad bearing assembly, the plurality of flex pad bodies connected to the flex pad bearing base through respective ligaments that extend between the flex pad bearing base and the plurality of flex pad bodies, each of the flex pad bodies having a circular arc bearing contact surface, a first sidewall circumferentially offset from a second sidewall, and a pair of nonlinear back walls that extend respectively from the first sidewall the second sidewall to a ligament associated with the respective flex pad body, wherein the flex pad bearing assembly includes a central passage defined by the bearing contact surfaces and having a passage diameter, wherein each flex pad body includes a thickness defined between the bearing contact surface and an average radial distance and the back segment from the central axis of the flex pad bearing assembly, and wherein a ratio of the thickness to the passage diameter of the flex pad bearing assembly is between 0.36 and 0.48.

A feature of the present application includes wherein the nonlinear back walls each include a first segment circular arc that extend circumferentially away from the first and second sidewalls, and wherein the nonlinear back walls each also include a second segment that extends from the first segment circular arc to the ligament.

Another feature of the present application includes wherein the first segment circular arc of each of the nonlinear back walls is located at a radial distance further from the central axis than ends of the ligaments located at the plurality of flex pad bodies.

Yet another feature of the present application includes wherein the first segment circular arc of each of the nonlinear back walls is located at a radial distance further from the central axis than ends of the ligaments located at the flex pad bearing base.

Still another feature of the present application includes wherein each of the first and second sidewalls extend radially away from the central axis a distance between the bearing contact surface and the nonlinear back walls, and wherein a center of mass of the flex pad bodies is located circumferentially offset from an axis of extension of the ligament as it extends toward the central axis.

Still yet another feature of the present application includes wherein each of the flex pad bodies include at least one threaded bore.

Yet still another feature of the present application includes wherein the at least one threaded bore is located a distance circumferentially offset from the ligament.

A further feature of the present application includes wherein the at least one threaded bore includes a counterweight threadingly engaged with the threaded bore.

Yet another aspect of the present application includes a method comprising: providing a flex pad bearing stock article having an annular shape and made from a first metallic material, the annular shape including a passage having an inner diameter and also having an outer circumferential extent; cutting a flex pad body shape into the flex pad bearing stock article, the cutting including following a path radially outward from the inner diameter to a first location, and following a non-circular arcing path between the first location and a second location denoting a first end of a flex pad ligament, and following a path from the first end of the flex pad ligament to a termination point denoting a second end of the flex pad ligament, the cutting resulting in a flex pad body shape having a ratio of material thickness in the radial direction divided by the inner diameter of between 0.36 and 0.48; and drilling and tapping a hole into the flex pad bearing stock article before the cutting, wherein the cutting includes cutting a plurality of flex pad body shapes to form a plurality of flex pad bodies, and wherein the drilling and tapping includes drilling and tapping holes into the plurality of flex pad body shapes.

A feature of the present application includes wherein the cutting includes utilizing a wire EDM process, and wherein each of the plurality of flex pad bearings includes a hole from the plurality of holes.

Another feature of the present application further includes threadingly engaging a counterweight into each of the respective holes.

Still another feature of the present application includes wherein the drilling and tapping holes includes locating the respective holes at a circumferential offset from each of the respective ligaments associated with each of the respective flex pad bodies.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A flex pad for a bearing base to support radial loads, the flex pad to be arranged about a central axis of a flex pad bearing assembly including the flex pad and the bearing base, the flex pad comprising:
   a flex pad body having a bearing contact surface defined by an arc having a first radial distance from the central axis of the flex pad bearing assembly, a first sidewall extending from the bearing contact surface, a second sidewall extending from the bearing contact surface and circumferentially offset with respect to the first sidewall, the first sidewall and the second sidewall each extending radially outward to at least a second radial distance from the central axis of the flex pad bearing assembly; and
   a ligament connected to the flex pad body, the ligament having a first end for the bearing base and a second end at the flex pad body, the second end of the ligament connected to the flex pad body at a third radial distance from the central axis of the flex pad bearing assembly between the first radial distance and the second radial distance, the first end of the ligament extending to a fourth radial distance from the central axis of the flex pad bearing assembly between the second radial distance and the third radial distance.

2. The flex pad as recited in claim 1, wherein the flex pad body comprises a back wall opposite the bearing contact surface, the back wall extending from the first sidewall and the second sidewall to the ligament.

3. The flex pad as recited in claim 2, wherein the back wall is defined by a non-circular arc.

4. The flex pad as recited in claim 2, wherein the back wall comprises a plurality of segments each located at a different radial distance from the central axis of the flex pad bearing assembly, the back wall defined by an average radial distance from the central axis of the flex pad bearing assembly as the back wall extends from the first sidewall and the second sidewall to the ligament.

5. The flex pad as recited in claim 4, wherein the flex pad bearing assembly defines a central passage having a passage diameter defined by the bearing contact surface and an opposing bearing contact surface of a second flex pad for the bearing base, the flex pad body having a thickness defined between the first radial distance of the arc of the bearing contact surface and the average radial distance of the back wall from the central axis of the flex pad bearing assembly, a ratio of the thickness of the flex bad body to the passage diameter between at least approximately 0.36 and 0.48.

6. The flex pad as recited in claim 1, wherein the flex pad body includes a threaded bore and a mass balance weight threadingly affixed to the threaded bore, the mass balance weight having a material density greater than a material density of the flex pad body.

7. The flex pad as recited in claim 1, wherein the flex pad body has a center of mass offset from an axis of extension of the ligament.

8. A flex pad for a bearing base to support radial loads, the flex pad to be arranged about a central axis of a flex pad bearing assembly including the flex pad and the bearing base, the flex pad comprising:
   a flex pad body having a bearing contact surface defined by an arc having a first radial distance from the central axis of the flex pad bearing assembly, a first sidewall extending from the bearing contact surface, a second sidewall extending from the bearing contact surface and circumferentially offset with respect to the first sidewall; and
   a ligament connected to the flex pad body, the ligament having a first end for the bearing base and a second end at the flex pad body, the first sidewall and the second sidewall of the flex pad body extending toward the second end of the ligament to a location between the bearing contact surface and the second end of the ligament and radially outward from the second end of the ligament.

9. The flex pad as recited in claim 8, wherein the first sidewall and the second sidewall each include a side segment that extends radially outward from the bearing contact surface, and a back segment that extends from the side segment to the second end of the ligament.

10. The flex pad as recited in claim 9, wherein the back segment is defined by a non-circular arc as the back segment extends from the side segment to the second end of the ligament.

11. The flex pad as recited in claim 10, wherein the back segment includes a first portion defined by a circular arc, and a union of the first portion with a remaining portion of the back segment results in a back segment having a non-circular arc.

12. The flex pad as recited in claim 10, wherein the back segment includes a plurality of portions each located at respective radial distances from the central axis of the flex pad bearing assembly, and the back segment is defined by an average radial distance from the central axis as the back segment extends from the side segment to the second end of the ligament at the average radial distance of the back segment.

13. The flex pad as recited in claim 12, wherein the flex pad bearing assembly defines a central passage having a passage diameter defined by the bearing contact surface and an opposing bearing contact surface of a second flex pad for the bearing base, the flex pad body having a thickness defined between the first radial distance of the arc of the bearing contact surface and the average radial distance of the back segment, a ratio of the thickness of the flex bad body to the passage diameter between at least approximately 0.36 and 0.48.

14. The flex pad as recited in claim 8, wherein the flex pad body includes a threaded bore and a mass balance weight threadingly affixed to the threaded bore, the mass balance weight having a material density greater than a material density of the flex pad body.

15. A flex pad for a bearing base to support radial loads, the flex pad to be arranged about a central axis of a flex pad bearing assembly including the flex pad and the bearing base, the flex pad comprising:
a flex pad body having a circular arc bearing contact surface, a first sidewall, a second sidewall circumferentially offset from the first sidewall, and a pair of nonlinear back walls that extend respectively from the first sidewall and the second sidewall; and
a ligament connected to the flex pad body, the nonlinear back walls extending to the ligament, the flex pad bearing assembly defining a central passage having a passage diameter defined by the bearing contact surface and an opposing bearing contact surface of a second flex pad for the bearing base, the flex pad body having a thickness defined between the circular arc bearing contact surface and an average radial distance of the back walls from the central axis of the flex pad bearing assembly, a ratio of the thickness of the flex bad body to the passage diameter between at least approximately 0.36 and 0.48.

16. The flex pad as recited in claim 15, wherein each one of the pair of nonlinear back walls includes a first segment circular arc that extends circumferentially away from the respective first sidewall or second sidewall, and each one of the pair of nonlinear back walls includes a second segment that extends from the first segment circular arc to the ligament.

17. The flex pad as recited in claim 15, wherein the first segment circular arc of each one of the pair of nonlinear back walls is located at a radial distance further from the central axis than a distance of an end of the ligament at the flex pad body.

18. The flex pad as recited in claim 17, wherein the first segment circular arc of each of the pair of nonlinear back walls is located at a radial distance further from the central axis than a distance of an end of the ligament at the bearing base.

19. The flex pad as recited in claim 15, wherein each one of the first sidewall and the second sidewall extends radially away from the central axis of the flex pad bearing assembly a distance between the circular arc bearing contact surface and the pair of nonlinear back walls, and a center of mass of the flex pad body is circumferentially offset from an axis of extension of the ligament as the ligament extends toward the central axis.

20. The flex pad as recited in claim 19, wherein the flex pad body includes at least one threaded bore.

* * * * *